United States Patent
Buening et al.

(10) Patent No.: US 6,750,578 B2
(45) Date of Patent: Jun. 15, 2004

(54) ROTATING ELECTRICAL MACHINE

(75) Inventors: Duane Joseph Buening, Anderson, IN (US); Michael L. Hull, Anderson, IN (US); Steve J. Shields, Muncie, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/200,661

(22) Filed: Jul. 22, 2002

(65) Prior Publication Data

US 2004/0012285 A1 Jan. 22, 2004

(51) Int. Cl.[7] ................................................ H02K 5/00
(52) U.S. Cl. ............................. 310/89; 310/64; 310/52
(58) Field of Search ......................... 310/89, 64, 51, 310/52

(56) References Cited

U.S. PATENT DOCUMENTS

| | | | |
|---|---|---|---|
| 4,546,280 A | 10/1985 | Pfluger | 310/68 D |
| 4,684,835 A | 8/1987 | Kline, Jr. et al. | 310/59 |
| 5,182,482 A | 1/1993 | Burke | 310/89 |
| 5,315,195 A | 5/1994 | Bradfield et al. | 310/89 |
| 5,317,224 A | 5/1994 | Ragaly | 310/58 |
| 5,686,773 A | 11/1997 | Sakakibara et al. | 310/91 |
| 5,696,415 A | 12/1997 | Fujimoto et al. | 310/89 |
| 5,760,513 A | 6/1998 | Morishita et al. | 310/91 |
| 5,767,602 A | 6/1998 | Sargeant | 310/258 |
| D404,046 S * | 1/1999 | Mandellos | D15/199 |
| 5,914,549 A | 6/1999 | Adachi et al. | 310/89 |
| 6,011,335 A | 1/2000 | Belley | 310/89 |
| 6,147,426 A | 11/2000 | Lepi et al. | 310/91 |
| 6,232,683 B1 | 5/2001 | Hirai et al. | 310/59 |
| 6,239,518 B1 | 5/2001 | Matsubara et al. | 310/58 |
| 6,417,585 B1 * | 7/2002 | Oohashi et al. | 310/58 |

FOREIGN PATENT DOCUMENTS

| | | | | |
|---|---|---|---|---|
| FR | 2745439 | * | 8/1997 | H02K/9/06 |
| JP | 11-332178 | * | 11/1999 | H02K/9/06 |

* cited by examiner

Primary Examiner—Burton S. Mullins
Assistant Examiner—Nguyen N Hanh
(74) Attorney, Agent, or Firm—Jimmy L. Funke

(57) ABSTRACT

A rotating machine is provided, including a rotor having a longitudinal axis with a connected fan and a stator surrounding said rotor. Front and rear frames rotatably support the rotor. At least one of said frames has a hub with a core with an opening for receiving a bearing mounting the rotor with said hub. The hub has an opening and ribs generally radially connecting the core with an outer rim of said hub. The ribs have a cross-sectional area being generally tilted with respect to a line extending generally parallel with the axis of said rotor.

15 Claims, 6 Drawing Sheets

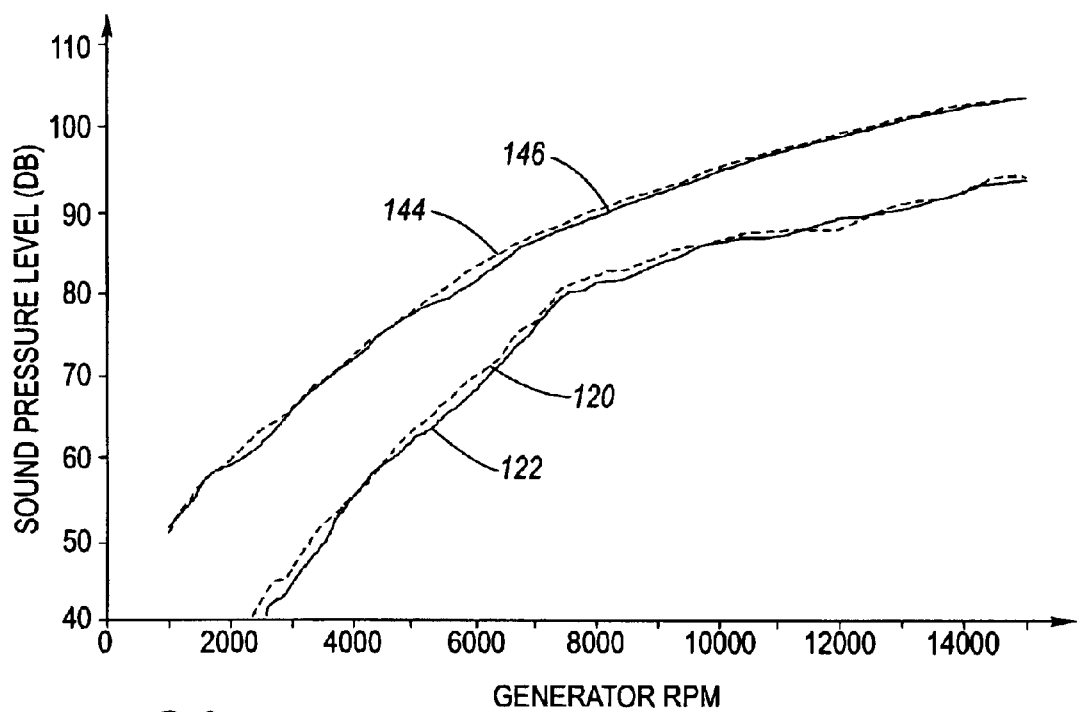
Fig. 11
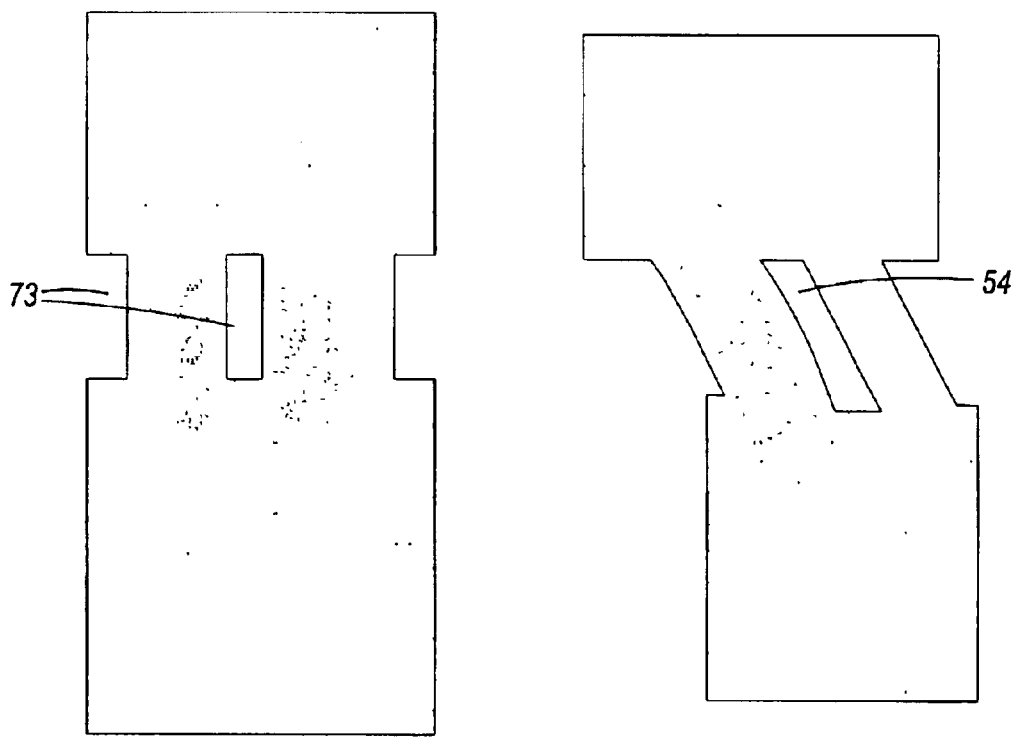
Fig. 12
Fig. 13

ROTATING ELECTRICAL MACHINE

TECHNICAL FIELD

The field of the present invention is that of rotating electrical machines, especially dynamo-electrical machines such as automotive alternators (generators).

BACKGROUND OF THE INVENTION

Rotating electrical machines such as automotive alternators (also commonly referred to as "generators") have two spaced apart frames which provide the main structural elements of the alternator. The frame closest to a pulley, which powers the alternator via a belt drive, is commonly referred to as the drive end frame. The opposite frame is commonly referred to as the slip ring end frame. The two frames support between them a rotor shaft with a connected rotor winding. The frames are held together typically by three or four bolts which are attached axially between ears or bosses on the outside of the frame.

Each frame has a hub. The hub includes an inner core having a central axial opening (sometimes referred to as the bearing bore). The inner core axial opening provides mounting support for an outer race of a roller bearing which mounts the rotor shaft to the hub. The outer race of the bearing is typically press fitted within this central opening of the core. Extending radially outward from the core are a series of hub ribs forming between themselves ventilation openings. The hub ribs connect the core with a rim of the hub.

Mounted on the shaft of the rotor in a position adjacent to the hub will be a fan. During operation of the alternator, fan blades pass close by the hub ribs, essentially shearing the air as the blades pass near the hub ribs. The result is "air" noise from the fan and hub rib interaction. Spacing or stagger of the hub ribs and fan blades is important since resonance and harmonics occur due to the fan and hub rib interaction resulting in an amplified noise level. Also, the distance between the fan blades and the hub ribs is critical. The closer these features are positioned to each other, the higher the air flow and the greater the interaction which results in an increased air noise.

A second effect of the hub ribs is on bearing vibration resulting in mechanical noise. The bearing itself is a source of vibration, due to the balls moving between the races in a dynamic setting. As the bore that the bearing race is press fitted into takes an out-of-round, the more mechanical noise typically occurs. The bearing bore (central axial opening) is machined round, with a tolerance that is fairly tight.

However, as mentioned previously the bearing is assembled within the bore as a press fit. During the application of interference, any hub geometry that is not cyclically symmetrical will result in the bearing and the bore taking a shape that is more deformed than initially as machined. The hub ribs are critical to this as they attach to the bore at discrete locations, basically providing a series of stiffer sections around the hub of the frame. The effect of the hub ribs is to cause the bore to become less round as a function of the stiffer sections.

It is desirable to provide a rotating electrical machine with hub ribs wherein air noise and mechanical noise are diminished, while at the same time maximizing air flow through the opening between the core and rim.

SUMMARY OF THE INVENTION

The present invention brings forth an electrical machine having a frame with a hub with an improved rib design which lowers air and mechanical noise. The hub ribs are angled from the axial direction to improve fan performance (air flow and cooling) as air is redirected from the axial direction through the hub ribs to a rotating radial direction through the fan blades. Tilting the hub cross-section from the axial also spreads the radial stiffness induced by the rib over the hub about a larger angle in the rotational direction. Therefore, roundness of the press fit bearing race is improved. With roundness being improved, vibration is reduced and mechanical noise is lessened.

Other features of the present invention will become more apparent to those skilled in the art after a review of the drawings and the accompanying detailed description.

BRIEF DESCRIPTION OF THE DRAWINGS

FIGS. 9–11 are graphic illustrations of sound pressure output versus generator rpm for prior art rotating electrical machines and alternators according to the present invention.

FIG. 12 is a prior art air flow chart illustrating fluid flow through a drive end frame.

FIG. 13 is a fluid flow chart illustrating fluid flow through a drive end frame according to the present invention.

DESCRIPTION OF AN EMBODIMENT OF THE INVENTION

Figure 1:
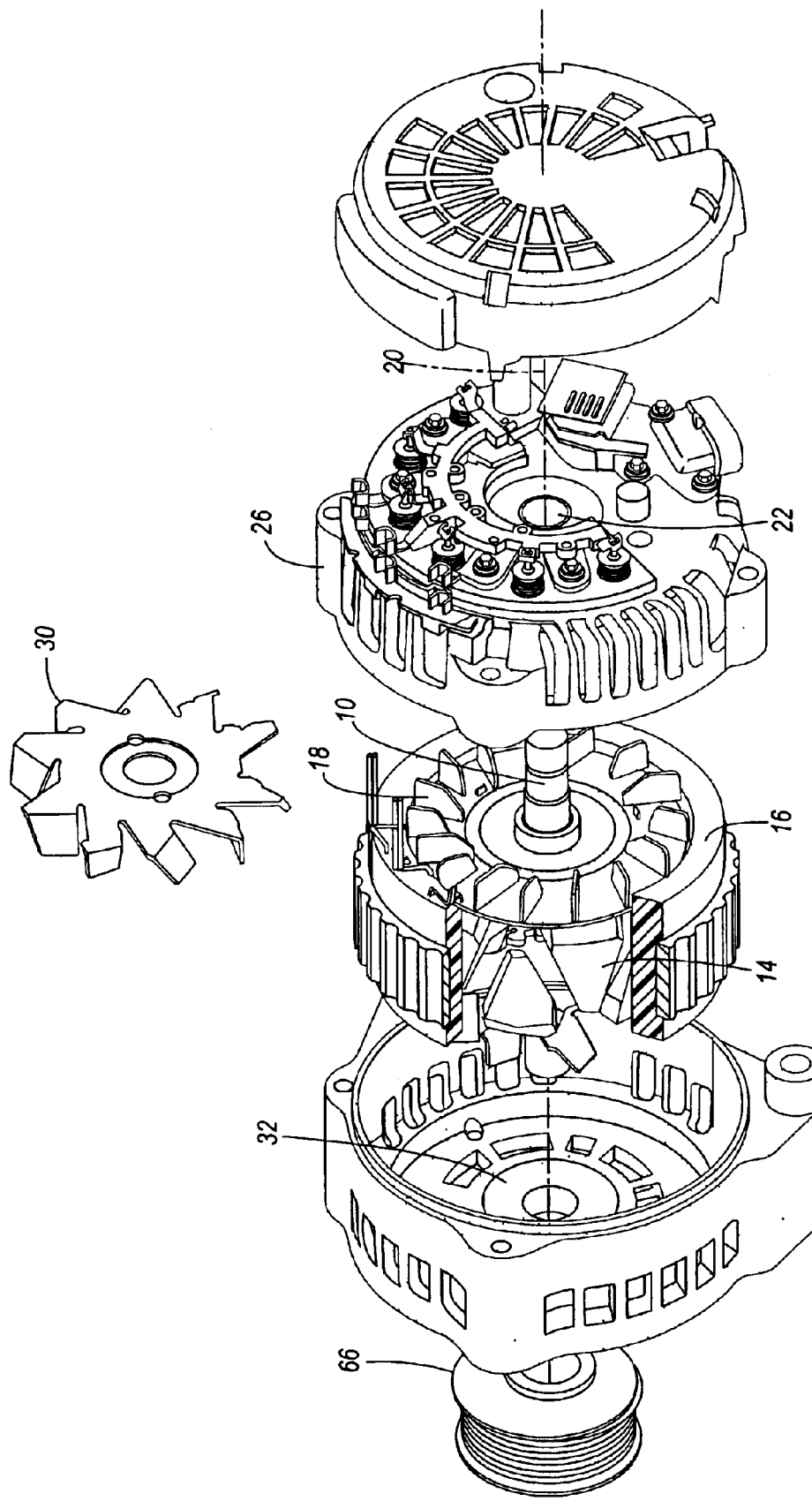
FIG. 1 is an exploded view of the rotating electrical machine such as an automotive alternator built according to the teachings of the present invention.
Figure 3:
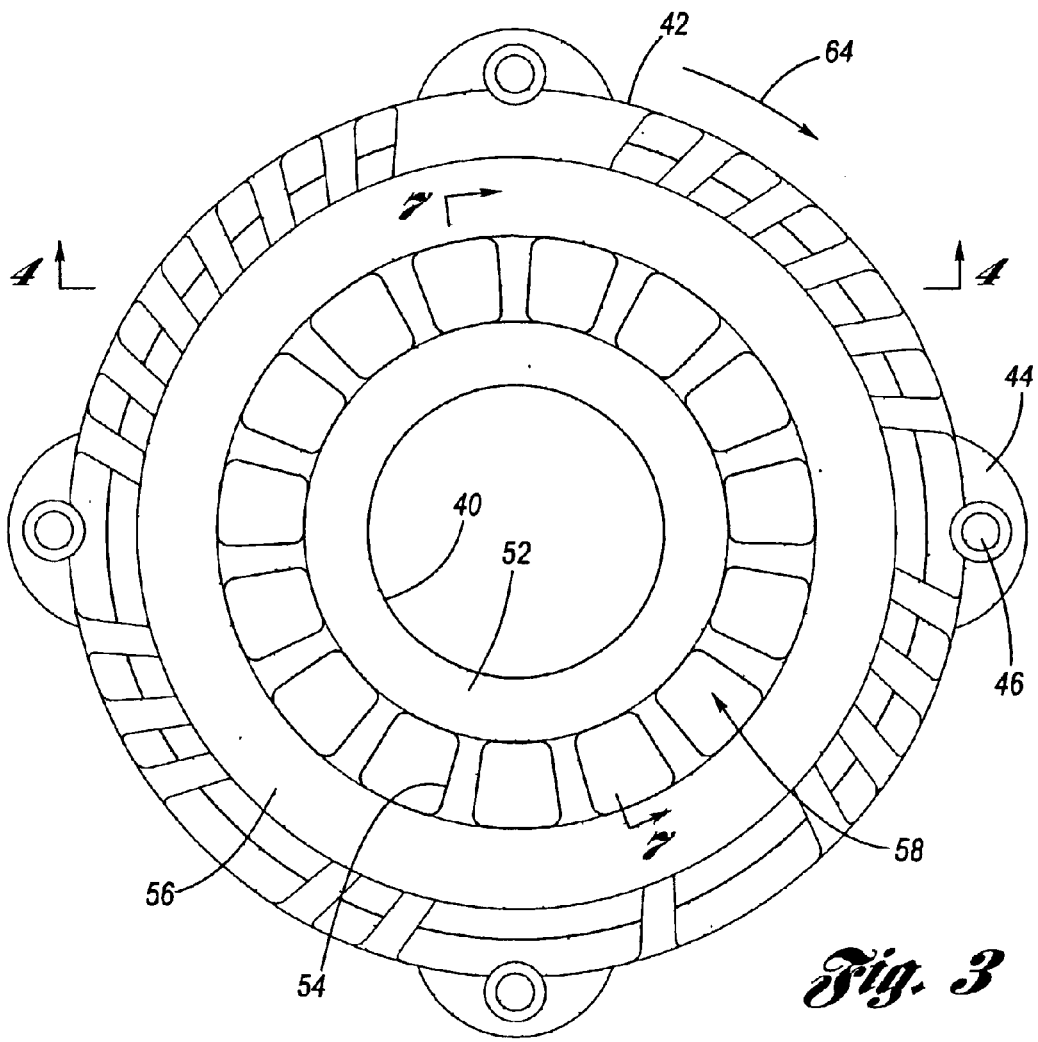
FIG. 3 is a front elevational view of a drive end frame of the alternator shown in FIG. 1.
Figure 4:
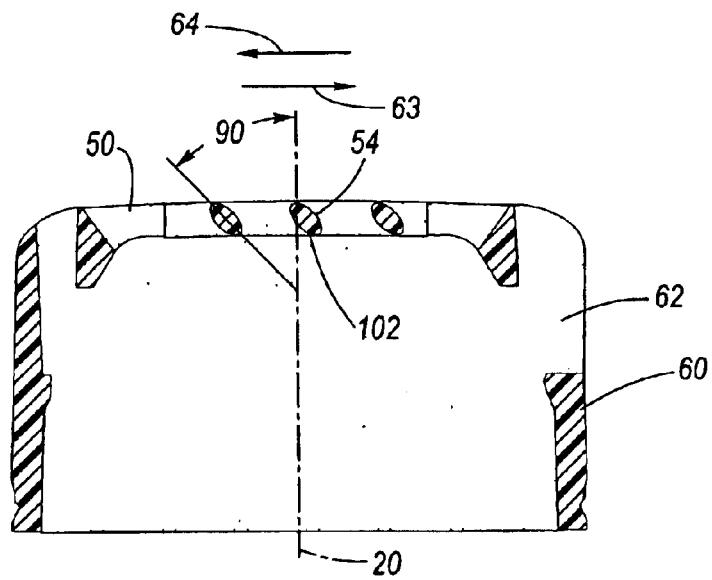
FIG. 4 is a sectional view taken along lines 4—4 of FIG. 3.
Figure 5:
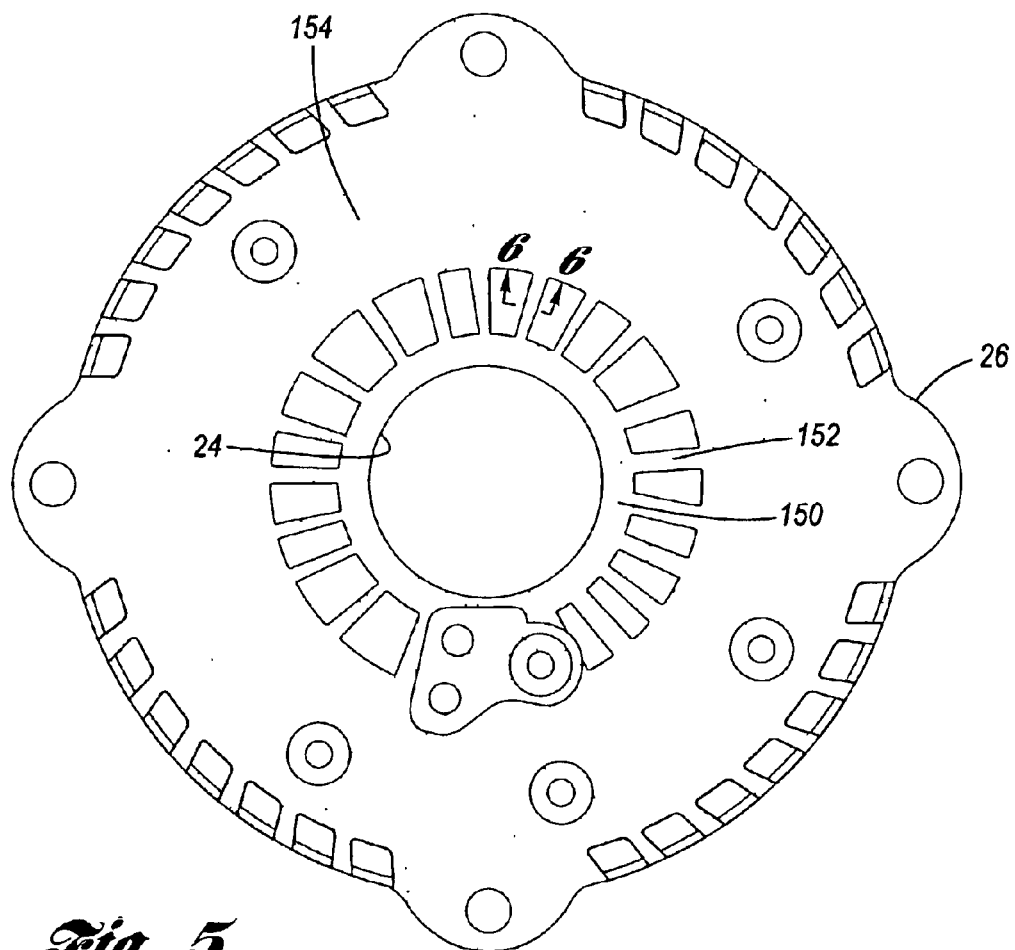
FIG. 5 is a front elevational view of a slip ring end of the alternator shown in FIG. 1 with a rectifier removed for clarity of illustration.

Referring to FIGS. 1, 3, and 4, a rotating electrical machine comprising an automotive alternator (sometimes referred to as a generator) is shown. The rotor shaft 10 has connected thereto rotor windings that are encircled by a stator 16. Connected on the rotor shaft 10 is a rear fan 18. The rotor shaft 10 extends along a longitudinal axis 20. A rear end of the rotor shaft is rotatably supported by a slip ring bearing 22. Referring additionally to FIG. 5, the slip ring bearing is press fit within an axial opening 24 of a slip ring end frame 26.

Figure 7:
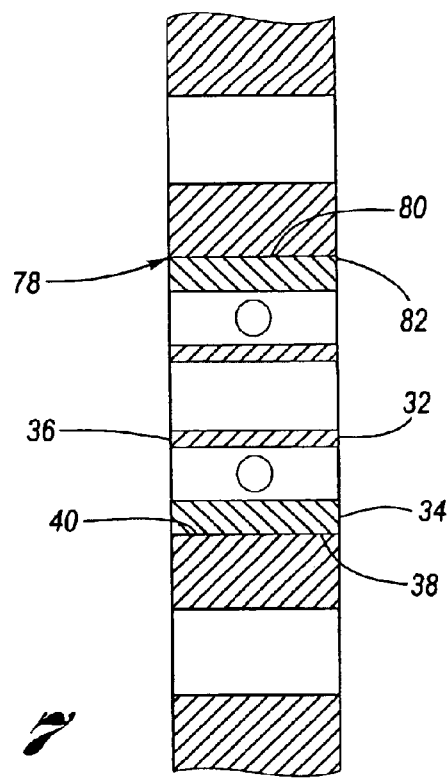
FIG. 7 is an enlarged sectional view taken along lines 7—7 of FIG. 3 with a bearing installed therein.

A forward end of the rotor shaft 10 has fixably connected therein a drive end or front end fan 30. Referring additionally to FIGS. 3 and 7, the front end of the rotor shaft 10 is rotatably supported by a bearing 32. The bearing 32 has an outer race 34. The bearing 32 also has an inner race 36 which is typically press fitted upon the rotor shaft 10. An outer surface 38 of the bearing is press fitted within an opening 40 of a drive end frame 42.

The drive end frame 42 has ears or bosses 44. The bosses 44 have apertures 46 formed or drilled therein to allow for the connection of the drive end frame 42 with the slip end frame 26 by a set of threaded fasteners (not shown). The drive end frame 42 has a generally flat region commonly referred to as the hub. The hub has a core 52. The core 52 has the aforementioned axial central opening 40. Extending generally radially from the core 52 are a series of ribs 54. The ribs 54 connect the core 52 with an outer rim 56. Between the ribs 54 are ventilation openings 58. Beyond the rim 50 is a side wall 60. The side wall 60 has a series of generally radial openings 62.

In operation, the fan 30 radial tip moves as shown in FIG. 3 in a clockwise direction denoted by arrow 64. The fan 30 is moved in the clockwise direction by the rotation of the rotor shaft 10. The rotor shaft 10 has its front extreme end fixably connected with a pulley 66. The pulley 66 is powered by a belt (not shown) which is in turn powered by a pulley connected with the crankshaft of an automotive engine (not shown). Rotation of the fan 30 causes air to be drawn within the ventilation openings 58 and to then be partially exited out the radial openings 62 and partially through the rotor axially.

Accordingly, from a design standpoint, it is desirable that the ventilation openings 58 be as great as possible to facilitate as great as possible airflow therethrough. However, the ribs 54 must be sufficiently strong (especially on the drive side frame) to support the bearing and rotor assembly which includes the rotor shaft 10 and the rotor windings 14. The frames 26, 42 support the alternator 7 upon the vehicle.

Figure 2:
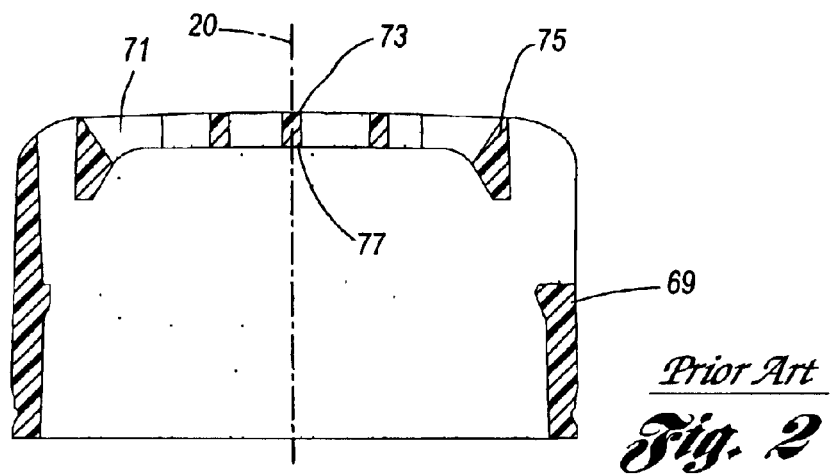
FIG. 2 is a cross-sectional view of a prior art drive end frame.

Referring additionally to FIG. 2 with like items being given common reference numerals, the prior art drive end frame 69 had a hub 71 which included a core (not shown) being connected by generally radially extending ribs 73. The ribs 73 in a manner aforedescribed were joined to a rim 75. The ribs 73 were generally elongated as much as possible in a direction generally parallel with the longitudinal axis 20 and were as thin as possible in the circumferential transverse direction to maximize the ventilation openings.

Referring additionally to FIGS. 8–11, the prior art frame 69 placed the ribs 73 closely adjacent to the position of the front fan 30. The rotation of the front fan 30 for fluid efficiency is typically placed closely adjacent to a front end 77 of the ribs 73. As the fan rotates adjacent to the rib, a wind noise is generated. The ribs 73 also created another problem. As mentioned previously, when the bearing 34 is press fitted into the opening 40, the opening 40 is radially deformed. This radially deformation (FIG. 8) is not even due to the radially strengthening effect provided by the rib 73.

Figure 8:
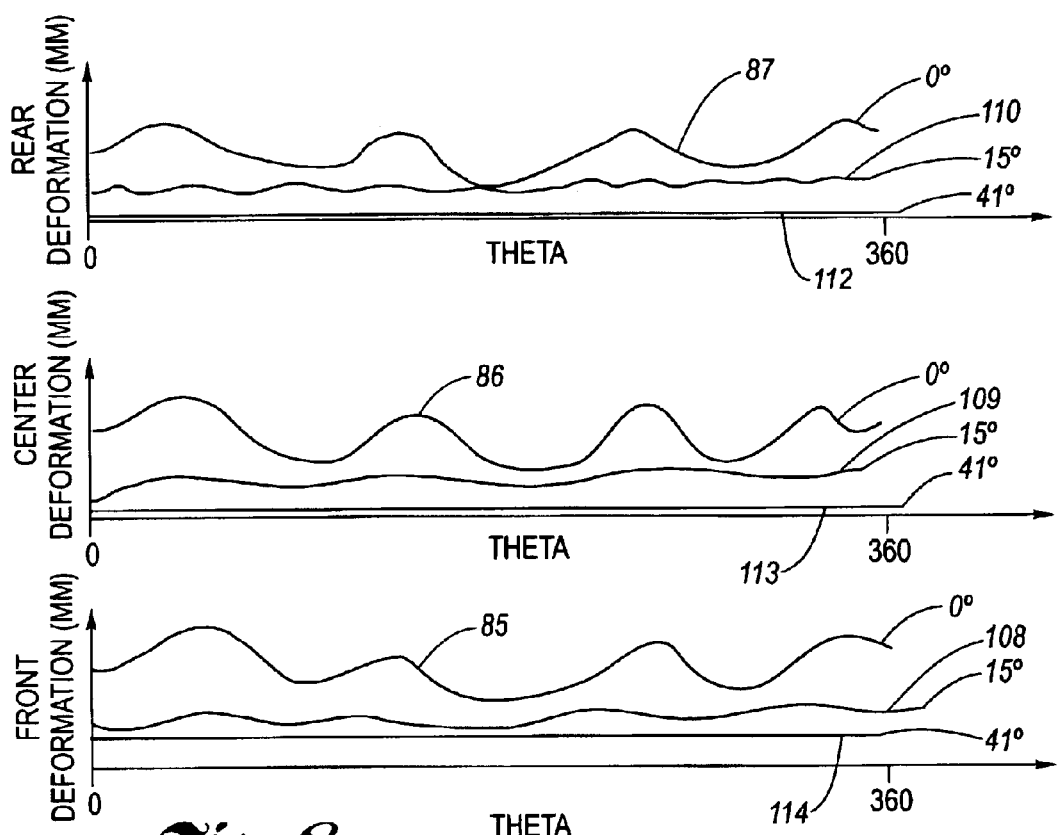
FIG. 8 is a perspective view illustrating deformation caused by a press fit insertion of an outer race of a bearing within an axial opening of the drive end frame.

Referring to FIG. 7, the opening 40 has a front end 78, a center portion 80 and a rear end 82. Press fit insertion of a bearing 32 within the opening 40 causes the opening 40 to distort radially. As shown in FIG. 8 by representative graph lines 85, 86, 87 for the front, center and rear portions of the opening, the deformation of the opening 40 is uneven around the circumference of the opening due to the strengthening effect of the ribs 73. This out-of-round condition contributes to the mechanical noise generated by the bearing 32 during alternator operation.

Referring back to FIGS. 3 and 4, the ribs 54 of the present invention have an elliptical a cross-sectional area with a major axis which is generally tilted by an angle 90 with respect to a line extending generally parallel with the longitudinal axis 20 of the rotor. The angle for angle 90 can be from approximately 7° to 45°. In most instances, the preferred angle for angle 90 is between 7° and 20° and in many instances will be between 9.5° and 15°.

The larger the alternator 7 outer diameter the larger the opening 58 will be with no adverse effect to coolant air flow through the opening 58. Therefore, the larger the alternator outer diameter, the larger the angle 90 can be adjacent to the core 52.

One of the first improvements in the ribs 54 in the alternator of the present invention is a lessening of the out of round condition. Since the ribs 54 are tilted, the material of the rib is placed over a wider circumferential area of the core.

Referring to FIG. 8, when the ribs 54 are tilted to 41°, the out of round condition is virtually eliminated. However, due to manufacturing and ventilation restraints, the tilt of the ribs 54 is typically designed between the 9.5° and 15° angle. An example of lines 108, 109 and 110 it can be seen that the out of circle condition of the opening 40 is significantly reduced and closely approaches that of the lines 112, 113 and 114 which represents the out of circle condition for the 41° tilt ribs.

The cross-sectional area of the ribs 54 is equal or closely equal to that of the prior art ribs 73. Therefore, strength of the ribs are not sacrificed for this mechanical improvement. The ribs 54 are elliptical having generally rounded front ends 102. The rounding of the front ends 102 also provides a fluid dynamic advantage to the present invention in that air shear noise is reduced due to the rounding of the rib.

Figure 9:
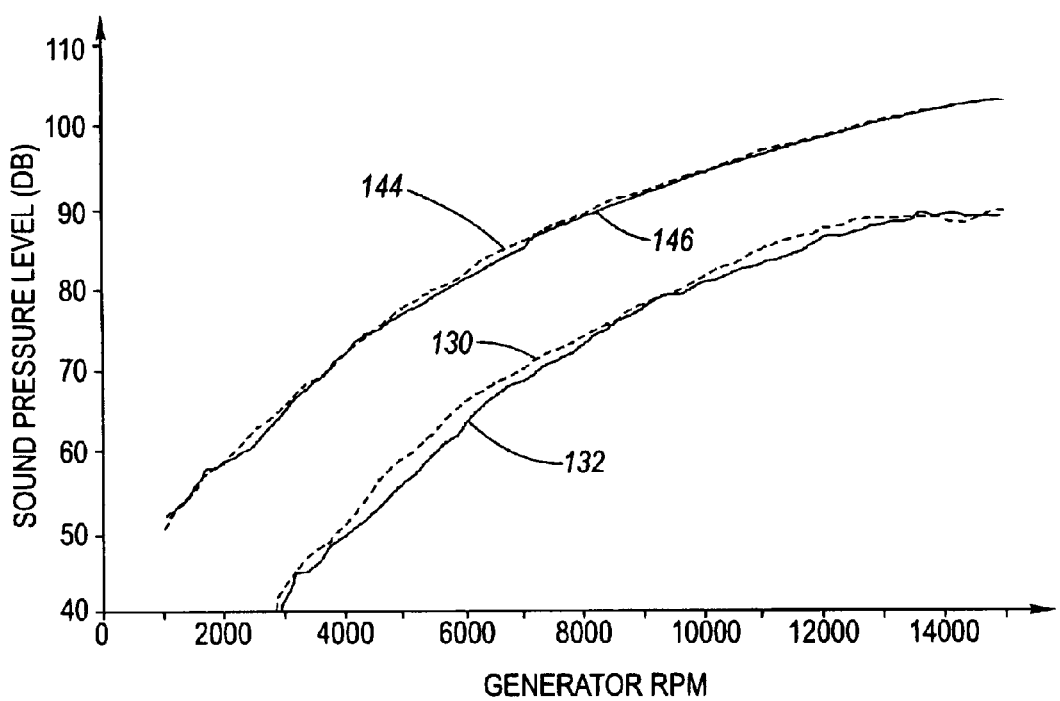
Figure 10:
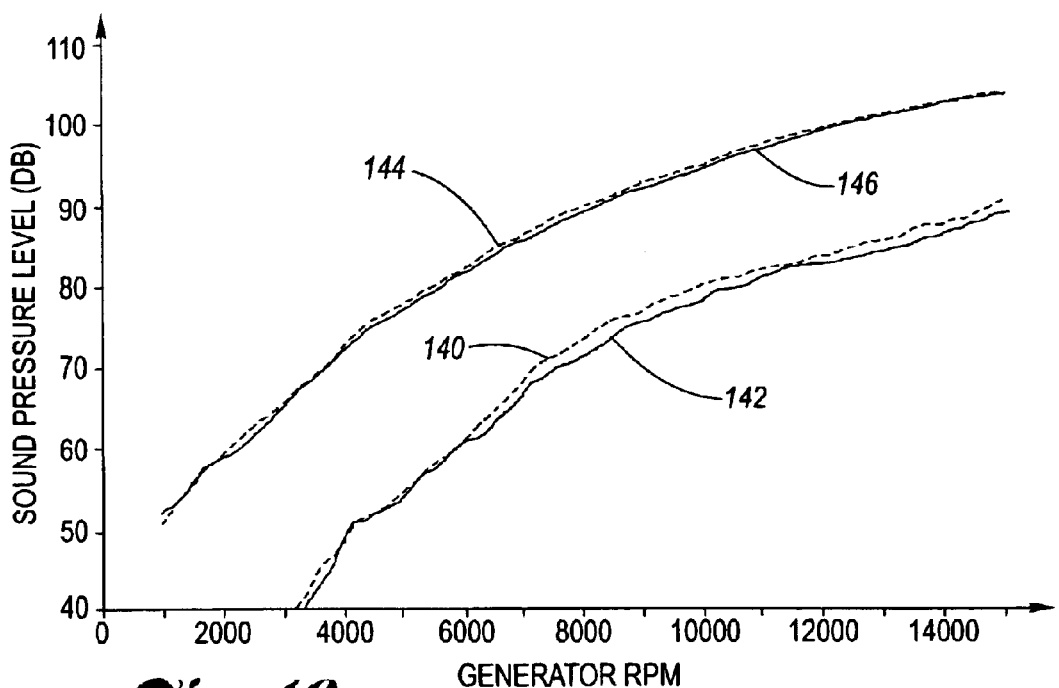

FIGS. 9–11 are graphs illustrating sound pressure in decibels verses generator rpms. Referring to FIG. 9, the lower dotted line 130 represents prior art mechanical noise with the generator at no load conditions for 8th order noise. Line 132 represents the 8th order mechanical noise of alternator 7 according to the present invention. Lines 144 and 146 represent overall mechanical noise response for the prior art and the inventive alternator. A reduction in decibel output for 8th order noise is generally shown virtually throughout the generator rpm operational range.

FIG. 10 provides lines 140 and 142 which illustrate the improvement in 10th order nose. FIG. 11 provides lines 120 and 122 showing improvement in 12th order response.

Referring to FIG. 12, an airflow diagram is provided. The velocity of the air passing between two adjacent ribs 73 is shown. The darkest areas show the areas of maximum air velocity. The lighter areas represent lower air velocity.

FIG. 13 provides identical information for ribs tilted as ribs 54. It has been found that tilted ribs have the effect of accelerating air velocity through the ribs. Empirical evidence has shown that the maximum air flow benefit at high rotational speeds is obtained if the tilt of the rib 54 is counter to the direction 64 of rotation of the fan 30 (FIG. 4). If the direction of the fan is in the direction of 63 (ribs tilting in the direction of the fan) air flow is increased at lower speeds with a slight reduction at higher speeds.

Figure 6:
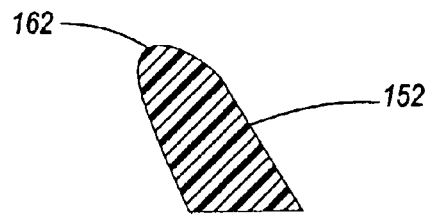
FIG. 6 is an enlarged sectional view taken along lines 6—6 of FIG. 5.

Referring additionally to FIGS. 5–6, the slip ring frame 26 has a core 150 connecting ribs 152 and a rim 154. Rib 152 might only be rounded at its front end 162.

While various embodiments of the present invention have been shown, it will be apparent to those skilled in the art of the various modifications which can be made to the present invention without departing from the spirit and scope of the present invention as it is defined in the appended claims.

What is claimed is:

1. A frame having a hub for supporting a rotor of a rotating electrical machine, said rotor having a fan connected thereon comprising:

an inner core with an axial opening for receiving a press-fitted outer race of a bearing for supporting said rotor;

an outer rim radially spaced away from said core;

a plurality of radial ribs connecting said rim with said core, said ribs having a generally elliptical cross-sectional area with a major axis being generally tilted with respect to a line extending generally parallel with an axis of a rotor supported in said inner core opening.

2. A frame and hub as described in claim 1, wherein said rib is tilted between 7° and 45°.

3. A frame and hub as described in claim 1, wherein said rib is tilted between 7° and 20°.

4. A frame and hub as described in claim 1, wherein said rib is tilted between 9.5° and 15°.

5. A rotating electrical machine comprising:

a rotor having a longitudinal axis;

a fan connected in said rotor;

a stator surrounding said rotor;

front and rear frames rotatably supporting said rotor, at least one of said frames having a hub with a core with an opening for receiving a bearing mounting said rotor with said hub, said hub having an opening and ribs generally radially connecting said core with an outer rim of said hub, said ribs having a generally elliptical cross-sectional area with major axis being generally tilted with respect to a line extending generally parallel with said axis of said rotor.

6. A rotating electrical machine as described in claim 5, wherein said rib is tilted between 7° and 45°.

7. A rotating electrical machine as described in claim 5, wherein said rib is tilted between 7° and 20°.

8. A rotating electrical machine as described in claim 5, wherein said rib is tilted between 9.5° and 15°.

9. A rotating electrical machine as described in claim 5, wherein said bearing has an outer race press fitted within said core opening.

10. A rotating electrical machine as described in claim 5, wherein said machine is a dynamo-electrical machine for powering an automotive vehicle and said frame is adjacent to a pulley which is fixably connected to said rotor and powers the rotor.

11. A rotating electrical machine as described in claim 5, wherein said tilt of said ribs is counter the direction of rotation of said fan.

12. A rotating electrical machine as described in claim 5, wherein said tilt of said ribs is in a common direction of a rotation of said fan.

13. A rotating electrical machine as described in claim 5, wherein said machine is a dynamo-electrical machine for powering a vehicle and said frame is adjacent a pulley which is fixably connected to said rotor and powers the rotor.

14. A rotating electrical machine as described in claim 5, wherein said machine is a dynamo-electrical machine for powering a vehicle and said frame supports an end of said rotor adjacent a slip ring for said rotor.

15. A rotating electrical machine comprising:

a rotor having a longitudinal axis;

a fan connected on said rotor;

a stator encircling said rotor;

front and rear frames rotatably supporting said rotor, at least one of said frames having a hub with a core with an axial opening for receiving an outer bearing race which is press fitted therein, said bearing inner race being connected on said rotor, said hub having an opening and an outer rim and generally radial ribs connecting said core with said outer rim of said hub, said ribs having a generally elliptical cross-sectional area with a major axis being tilted 7° to 45° with respect to a line extending generally parallel with an axis of said rotor and said tilt of said ribs being counter a direction of rotation of said fan and being generally adjacent thereto.

* * * * *